United States Patent [19]

Igata et al.

[11] Patent Number: 4,611,252

[45] Date of Patent: Sep. 9, 1986

[54] VIDEO TAPE RECORDER

[75] Inventors: Kouichi Igata, Hirakata; Masaaki Kobayashi, Kawanishi, both of Japan

[73] Assignee: Matsushita Electric Industrial Co., Ltd., Osaka, Japan

[21] Appl. No.: 504,513

[22] Filed: Jun. 15, 1983

[30] Foreign Application Priority Data

Jun. 16, 1982 [JP] Japan .................. 57-104218

[51] Int. Cl.⁴ .................. H04N 5/783; G11B 15/46
[52] U.S. Cl. .................. 360/10.3; 360/73; 360/70
[58] Field of Search .................. 360/10.3, 10.2, 10.1, 360/73, 70

[56] References Cited

U.S. PATENT DOCUMENTS

| | | | |
|---|---|---|---|
| 3,934,269 | 1/1976 | Fujita | 360/70 |
| 4,127,881 | 11/1978 | Wakami | 360/73 |
| 4,212,039 | 7/1980 | Koda | 360/73 |
| 4,328,518 | 5/1982 | Kawata | 360/10.3 |
| 4,338,640 | 7/1982 | Yabu | 360/73 |
| 4,393,422 | 7/1983 | Yokobori | 360/73 |
| 4,426,666 | 1/1984 | Koboyashi | 360/10.3 |

Primary Examiner—Alan Faber
Attorney, Agent, or Firm—Wenderoth, Lind & Ponack

[57] ABSTRACT

A video tape recorder has a simple helical-scan construction capable of variable-speed reproduction free from noise bars on reproduced images at desired speeds ranging from a normal speed in reverse reproduction to threefold normal speed in forward reproduction. The video tape recorder comprises a magnetic tape drive mechanism including a capstan motor and a pinch roller for driving a magnetic tape, a control circuit for moving the magnetic tape at constant speeds including a normal speed, a twofold speed, a threefold speed in forward reproduction and a normal speed in reverse reproduction, and for keeping the magnetic tape stationary, a speed setting circuit for setting any one of the foregoing speeds as a tape running speed, a control signal reproducing circuit for reproducing control signals recorded on the magnetic tape at one-frame intervals, a control signal selection circuit for selecting a control signal dependent on a speed setting from the reproduced control signals, a time setting circuit for varying a time setting starting from a control signal selected by the control signal selection means, and a speed changing circuit for changing the normal speed in reverse reproduction, the stationary, the normal speed, the twofold normal speed, and the threefold normal speed in a time interval of a few frames.

6 Claims, 19 Drawing Figures

FIG. 4.
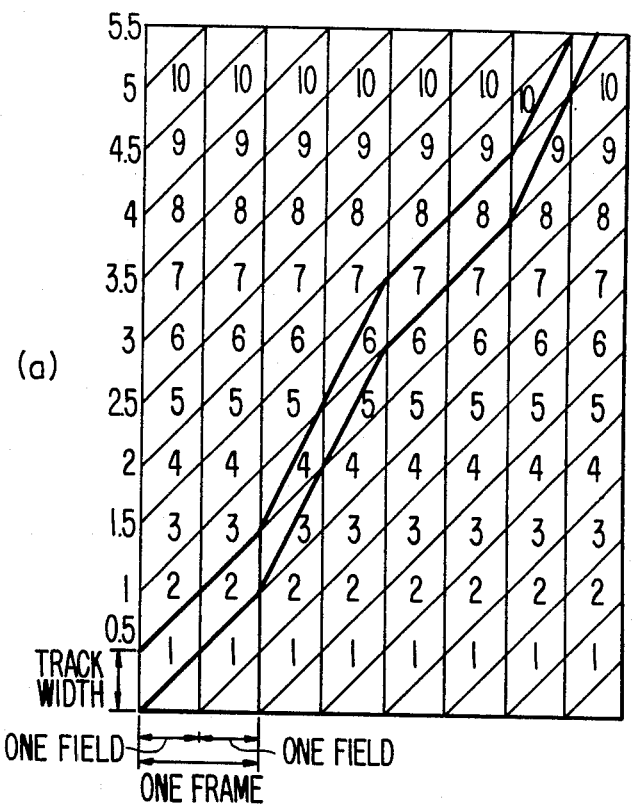
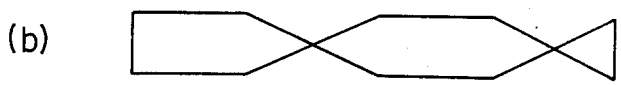
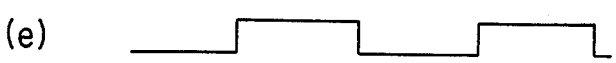

FIG. 8.
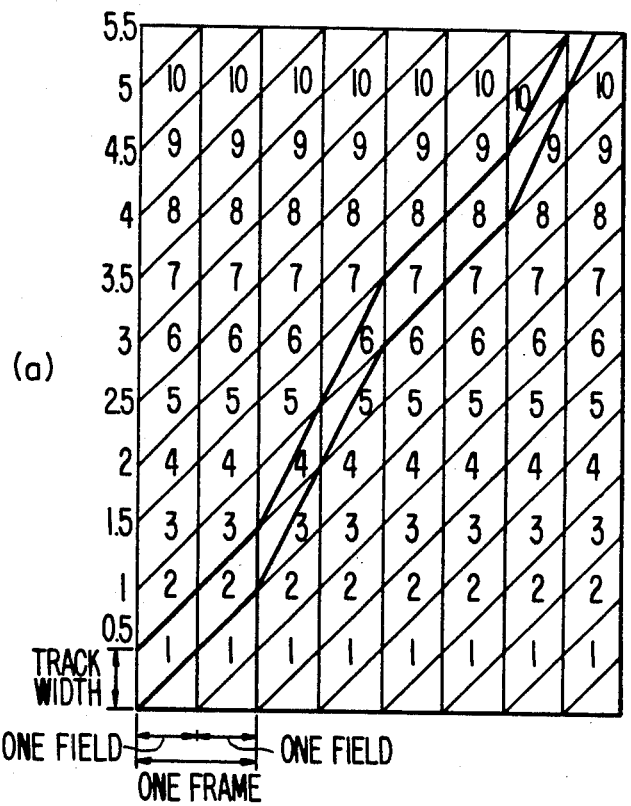
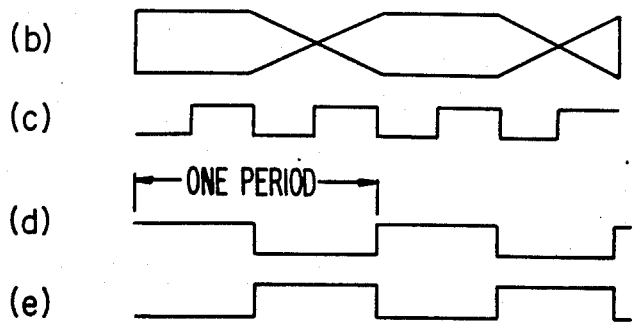

FIG. 9.
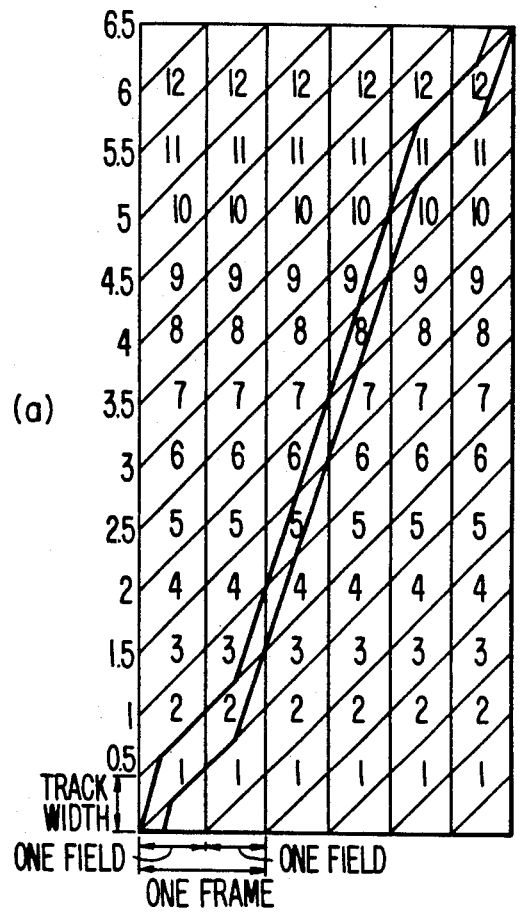
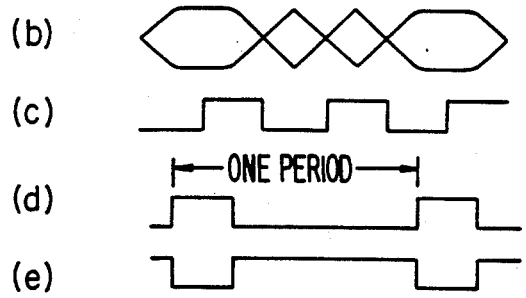

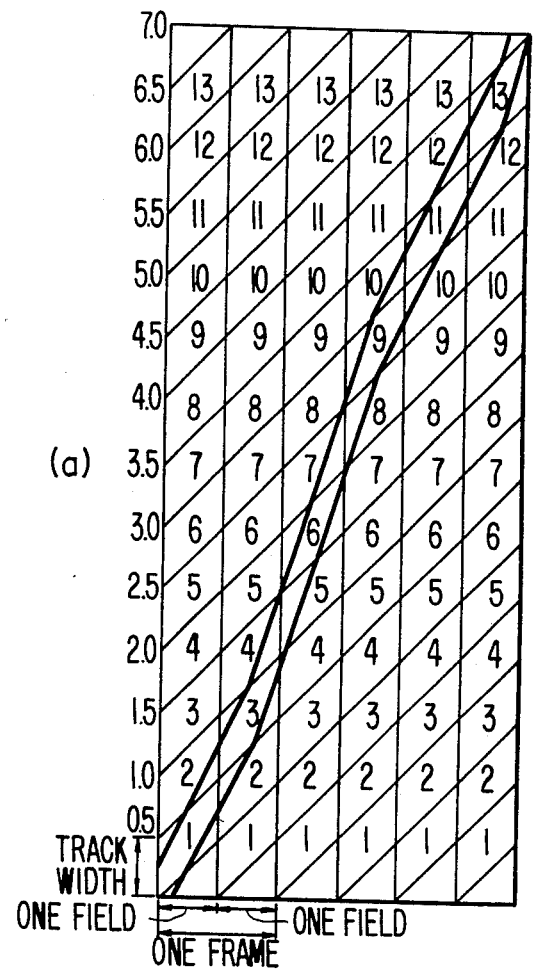
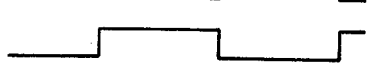
FIG. 14.

VIDEO TAPE RECORDER

BACKGROUND OF THE INVENTION

1. Field of the Invention

The present invention relates to a helical-scan video tape recorder (hereinafter referred to as "VTR"), and more particularly to such a VTR capable of playing back recorded video signals at various desired speeds ranging from a normal speed in reverse reproduction to a threefold normal speed in forward reproduction.

2. Description of the Prior Art

When a magnetic tape is to be played back at a speed different from a normal reproduction speed (a mode hereinafter referred to as a "special reproduction"), a video head scans the magnetic tape along tracks different from recorded tracks thereon. Therefore, in such a special reproduction mode, it is impossible to scan a single recorded track accurately. As a result, there is created a period characterized by a reduced reproduced signal level.

Where such a period of lower reproduced signal level is positioned in the vicinity of a vertical synchronous signal, a television receiver reproducing the video signals is substantially free of noise bars and hence capable of generating good reproduced images. Speeds at which the magnetic tape can be fed while producing noise-free images in the special reproduction mode are limited to fixed speeds such as a normal speed, a stationary image, a double normal speed, and a threefold normal speed. When the magnetic tape is fed along at other speeds such as those higher than the threefold normal speed or intermediate speeds between a normal speed in reverse reproduction (−normal speed) and the threefold normal speed, such for example as a 0.4 normal speed in reverse reproduciton (−0.4 normal speed), a 0.6 normal speed, a 1.5 normal speed, and a 2.5 normal speed, the television receiver produces fields in which the reproduced signal level is much lowered, resulting in noise bars on reproduced images with a failure in reproducing good images.

Such a condition will be described with reference to FIG. 1 of the accompanying drawings. FIG. 1 (a) shows repeated recorded-track patterns of a 2-head helical-scan VTR. A graduation on the horizontal axis indicates a period of one field and a timing of a head changeover switch. The vertical axis indicates the distance of movement of a magnetic tape, with a single graduation showing the distance of travel of the tape during a single field period in a recording mode or a normal reproducing mode. The single graduation on the vertical axis also represents the width of a recorded track. The two video heads have slightly different head gap angles for azimuth recording.

In the patterns of recorded tracks shown in FIG. 1, those tracks recorded with a head A are odd-numbered, while those tracks recorded with a head B are even-numbered. The odd-numbered tracks can be reproduced only by the head A, while the even-numbered tracks can be reproduced only by the head B. The thicker lines G are indicative of paths of the heads at the time of signal reproduction at a speed that is 0.6 times the normal reproducing speed. FIG. 1 (b) shows an envelope waveform in the 0.6 normal speed reproduction. FIG. 1 (c) illustrates an envelope waveform in a stationay-image reproduction and a double normal speed reproduction, and (d) an envelope waveform at a fourfold normal speed reproduction and a reverse twofold normal speed reproduction. With the envelope (c), it is possible to position a period of a lowered reproduced signal level in the vicinity of times at which the fields are changed. With the envelope (b), however, there will be fields in which the reproduced signal level is lowered. The envelope (d) results in fields in which the reproduced signal level is reduced in the vicinity of the center of the field. Accordingly, only the envelop (c) produced in the still and twofold normal speed reproduction modes is capable of reproducing good video images.

It is therefore quite difficult to perform variable-speed reproduction in special reproduction modes. There are known methods of displacing a playback magnetic head in order to follow recorded tracks on a magnetic tape for variable-speed reproduction. However, such known arrangements are complex in construction and high in cost.

SUMMARY OF THE INVENTION

It is an object of the present invention to provide a VTR which is simple in construction, less costly to construct, and capable of accomplishing variable-speed special reproduction ranging from a −1 normal speed to a threefold normal speed through combinations of playback speeds such as a −1 normal speed, a still, a twofold speed, a threefold speed, which provide good envelopes of reproduced signal waveforms, with a normal speed, the VTR having a recording magnetic head which can double as a reproducing magnetic head in such special reproduction modes.

According to the present invention, recorded video signals can be reproduced at variable speeds ranging from a normal speed in reverse reproduction to a threefold normal speed in forward reproduction without suffering from noise bars on reproduced images by changing over a normal speed in reverse reproducing, a normal speed, a still, a twofold speed, and a threefold speed. During a period in which the magnetic tape is kept stationary or runs at the twofold normal speed, a main head and an auxiliry head are selectively used to select signals having a larger reproduced envelope waveform for thereby producing a maximum reproduced output, so that good variable-speed reproduced images can be played back on the screen.

The above and other objects and features of the present invention can be achieved by a video tape recorder comprising: magnetic tape drive means including a capstan motor and a pinch roller for driving a magnetic tape, control means for moving the magnetic tape at constant speeds including a normal speed, a twofold speed, a threefold speed in forward reproduction and a normal speed in reverse reproduction, and a still reproduction; speed setting means for setting any one of the foregoing speeds as a tape running speed; control signal reproducing means for reproducing control signals recorded on the magnetic tape in one-frame period; control signal selection means for selecting a control signal dependent on a speed setting from the reproduced control signals; time setting means for varying a time setting starting from a control signal selected by the control signal selection means; and speed changing means for changing the normal speed in reverse reproduction, the still reproduction, the normal speed, the twofold normal speed, and the threefold normal speed in forward reproduction in a period of a few frames, the arrangement being that an acceleration timing for changing the magnetic tape running speeds is effected by a signal obtained by processing the waveform of a head switching pulse for rotatable heads in response to a signal from the speed setting means, and a deceleration timing for the magnetic tape running speeds is effected by an output signal from the time setting means.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIGS. 3(a) through 3(i), 4(a) through 4(i), and 5(a) through 5(i) are diagrams showing head tracks in special reproduction modes according to the present invention, envelope waveforms of reproduced signals, speed command signals and other signals produced in the VTR shown in FIG. 2;

FIGS. 7(a) through 7(e), 8(a) through 8(e), and 9(a) through 9(e) are diagrams showing head tracks in special reproduction modes, envelope waveforms of reproduced signals, and speed command signals produced in the VTR shown in FIG. 6;

FIGS. 12(a) through 12(f), 13(a) through 13(f), and 14(a) through 14(f) are diagrams showing head tracks in special reproduction modes, envelope waveforms of reproduced signals, head switching pulse waveforms, waveforms of main and auxiliary head changeover signals, and speed command signals produced in the VTR according to the third embodiment.

DESCRIPTION OF THE PREFERRED EMBODIMENTS

Figure 2:
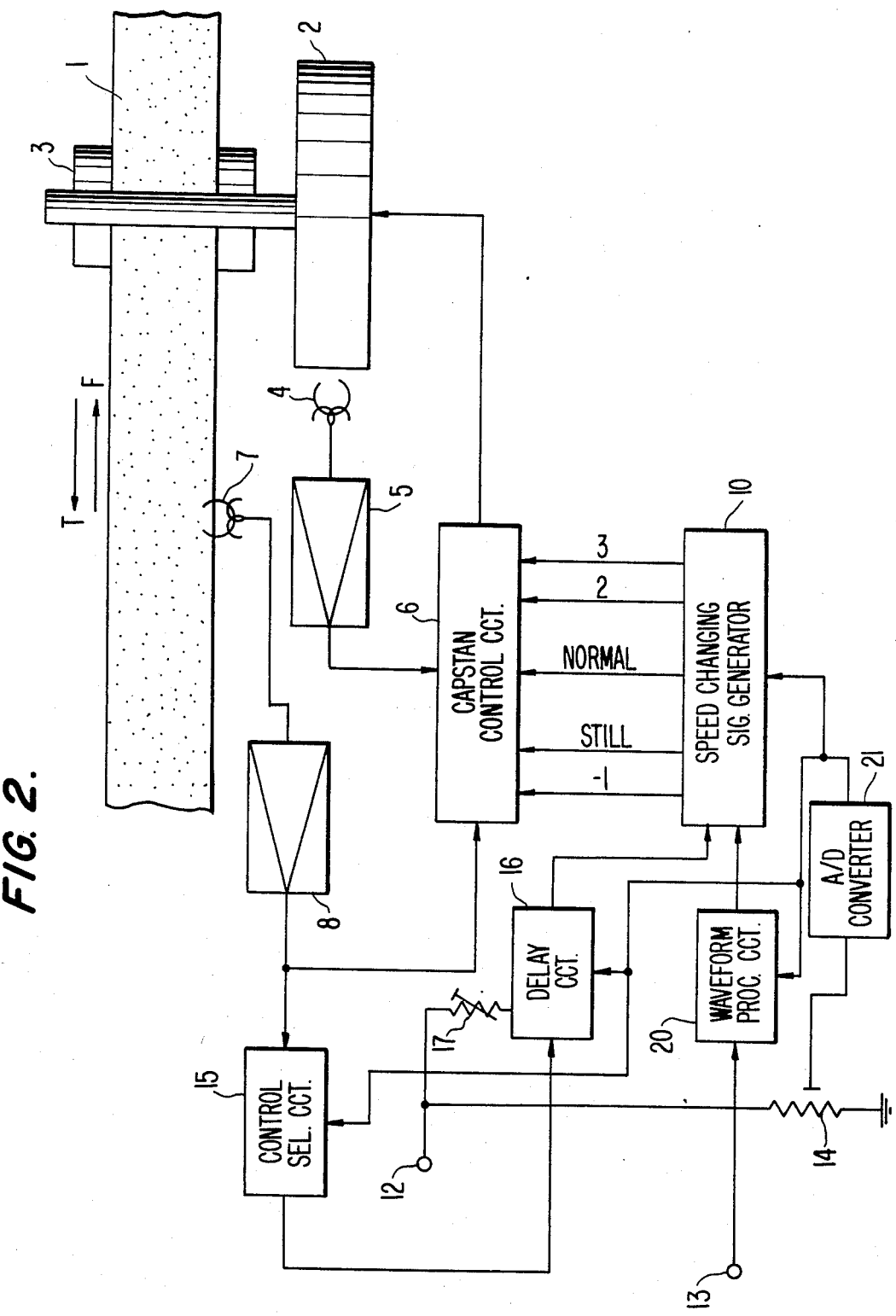
FIG. 2 is a block diagram of a first embodiment of a VTR according to the present invention.

As shown in FIG. 2, a magnetic tape 1 is driven by a capstan motor 2 and a pinch roller 3 to run in either the direction of the arrow F or the direction of the arrow T. When the magnetic tape 1 travels in the direction of the arrow F, signals recorded thereon are played back in forward reproduction. When the magnetic tape 1 travels in the direction of the arrow T, signals recorded thereon are played back in reverse reproduction. An FG head 4 serves to detect a rotational speed signal from the capstan motor 2 and produce an output which is amplified by an amplifier 5. The amplified signal from the amplifier 5 is fed to a capstan control circuit 6. A control head 7 reproduces control signals recorded on the magnetic tape 1 at one-frame intervals, and produces an output signal which is amplified by an amplifier 8. The amplified signal from the amplifier 8 is supplied to the capstan control circuit 6 and also to a control signal selection circuit 15.

An input terminal 13 receives head switching pulses (FIG. 3(c)) indicative of changeover between and rotational phase of two rotatable magnetic heads (not shown) attached to a known rotatable cylinder (not shown), the input terminal 13 being connected to an input terminal of a waveform processing circuit 20. The waveform processing circuit 20 effects various waveform processings such as frequency division, delaying, and gating of the head switching pulses. An output from the waveform processing circuit 20 is applied to a speed changing signal generator 10.

A variable resistor 14 is operated by a user for playing back recorded video signals at various speeds in special reproduction. One terminal of the variable resistor 14 is connected to a power supply terminal 12 and the other terminal is connected to ground. The variable resistor 14 has a center tap from which a voltage is applied to an A/D (analog-to-digital) converter 21. The A/D converter 21 serves to convert the voltage from the variable resistor 14 into a digital signal, which is supplied to the waveform processing circuit 20, the speed changing signal generator 10, the control signal selection circuit 15, and a delay circuit 16. The control signal selection circuit 15 is composed of gate circuits and the like responsive to the signal from the A/D converter 21 for producing a control signal necessary for a speed setting. The control signal from the control signal selection circuit 15 is fed to the delay circuit 16. The delay circuit 16 changes its time setting in response to the signal from the A/D converter 21. The time setting in the delay circuit 16 is also variable by a variable resistor 17. An output signal from the delay circuit 16 is fed to the speed changing signal generator 10.

The speed changing signal generator 10 is responsive to the signal from the A/D converter 21 for producing command signals indicative of a −1 normal speed, a stationary image (still image), a normal speed, a twofold normal speed, and a threefold normal speed to the capstan control circuit 6 at a timing of the output signals from the waveform processing circuit 20 and the delay circuit 26 for thereby changing the speed and direction of travel of the magnetic tape 1. The capstan control circuit 6 is arranged to rotate the capstan motor 2 at a constant speed according to the command signal supplied thereto.

The capstan control circuit 6 is capable of controlling the speed of rotation of the capstan motor 2 in response to a signal from the FG head 4, and also capable of controlling the phase of the capstan motor 2 in response to a control signal reproduced by the control head 7.

Since it requires time for effecting phase control, the phase control loop is inhibited from operation during variable-speed reproduction. No control is effective when the capstan motor 2 is to be stopped. Therefore, the capstan control circuit 6 is arranged to produce a braking signal for a certain period of time for stopping the capstan motor 2 in response to a still command.

Figure 15:
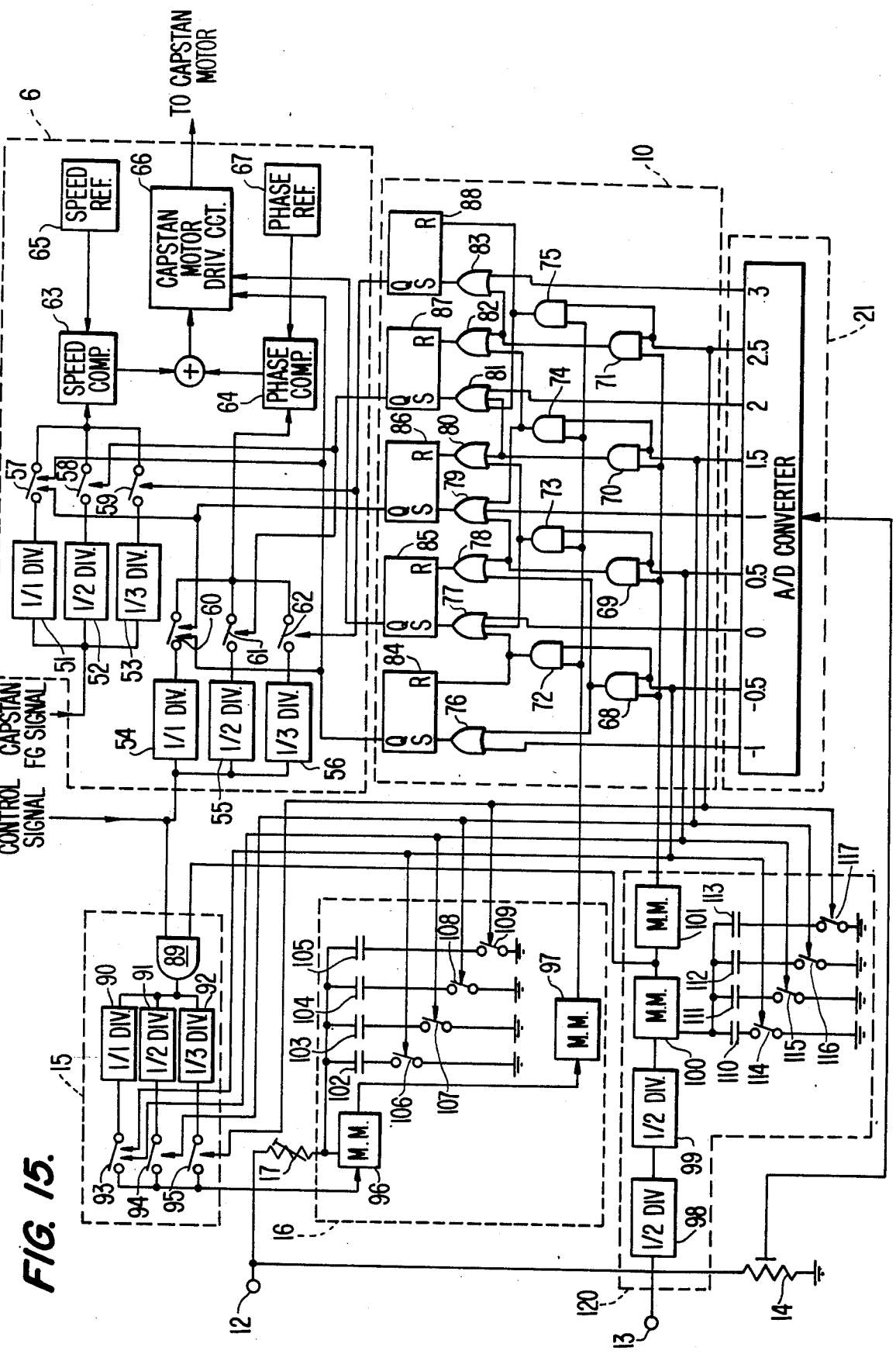
FIG. 15 is a circuit diagram of a specific circuit arrangement for the VTR according to the second embodiment.

FIG. 15 shows in specific detail the capstan control circuit 6, the speed changing signal generator 10, the control signal selection circuit 15, the delay circuit 16, the waveform processing circuit 20, and the A/D converter 21 illustrated in FIG. 2.

The capstan control circuit 6 comprises frequency dividers 51, 52, 53 and changeover switches 57, 58, 59 for the capstan FG signal, frequency dividers 54, 55, 56 and changeover swtiches 60, 61, 62 for the control signal, a speed comparator 63, a phase comparator 64, a speed reference signal generator 65, a phase reference signal generator 67, and a capstan motor driver circuit 66. In response to a speed changing signal from the speed changing signal generator 10, the capstan control circuit 6 produces a signal by frequency-dividing the capstan FG signal and the control signal at a frequency division ratio of 1/1 at a −1 normal speed and a normal speed; a signal by frequency-dividing the capstan FG signal and the control signal at a frequency division ratio of ½ at a double normal speed; and a signal by frequency-dividing the capstan FG signal and the control signal at a frequency division ratio of ⅓ at a threefold normal speed. The capstan FG signal frequency-divided by the respective speed command signal is applied to the speed comparator 63 in which it is compared with a speed reference signal from the speed reference signal generator 65. The frequency-divided control signal is applied to the phase comparator 64 in which it is compared with a phase reference signal from the phase reference signal generator 67. Output signals from the speed comparator 63 and the phase comparator 64 are added, and the added signal is fed to the capstan motor driver circuit 66 for rotating the capstan motor according to the speed command signal. The capstan motor driver circuit 66 is also supplied twith a still command signal and a −normal speed command signal. With these command signals, the capstan motor is stopped when a still image is needed, and reversed when a −1 normal speed is needed.

The control signal selection circuit 15 is composed of an AND gate 89, frequency dividers 91, 92, 93, and changeover switches 93, 94, 95. The AND gate 89 serves to select a control signal for a necessary speed. For a 1.5 normal speed achieved by alternate repetition of a normal speed and a twofold normal speed, for instance, a control signal reproduced at the twofold speed is selected. The selected control signal is frequency-divided at a ratio of ½. As a consequence, a necessary control signal is selected. The control signal selection circuit 15 serves to select one of control signals reproduced at higher repetitive speeds.

The delay circuit 17 comprises monostable multivibrators (hereinafter referred to as "M. M.") 96, 97, capacitors 102, 103, 104, 105, and changeover switches 106, 107, 108, 109. The M. M. 96 delays the control signal selected by the control signal selection circuit 15 for a desired period of time. The capacitors for setting delay times can be selected to provide a delay time for a selected speed. The M. M. 97 produces pulses after the control signal has been delayed.

The waveform processing circuit 20 includes ½ frequency dividers 98, 99, M. Ms. 100, 101, capacitors 110, 111, 112, 113, and changeover switches 114, 115, 116, 117. A head switching signal supplied to the head switching pulse input terminal 13 is frequency-divided by the ½ frequency dividers 98, 99 at a ratio of ¼. The frequency-divided signal is delayed by the M. M. 100 to provide a noiseless speed changing timing. The delay time setting in the M. M. 100 is determined by the capacitors 110, 111, 112, 113 which are selected by the changeover switches 114, 115, 116, 117 to provide optimum delay times respectively for the speeds. The M. M. 101 generates a pulse for changing the speedcs in response to the signal from the M. M. 100.

The A/D converter 21 produces a speed command signal of high logic level in response to an input voltage from the variable resistor 14. For example, the A/D converter 21 can produce signals indicative of speeds ranging from a −1 normal speed to a threefold normal speed in increments of a 0.5 normal speed. These speeds however can be selected as desired. The speeds such as a −1 normal speed, a still-image, a normal speed, a double normal speed, and a threefold normal speed are of a fixed rate of speed. The speeds such as a −0.5 normal speed, a 0.5 normal speed, a 1.5 normal speed, and a 2.5 1 normal speed can be achieved by alternate repetition of two different speeds.

The speed changing signal generator 10 is composed of AND gates 68, 69, 70, 71, 72, 73, 74, 75, OR gates 76, 77, 78, 79, 80, 81, 82, 83, and RS flip-flops 84, 85, 86, 87, 88.

The speed changing signal generator 10 is responsive to a speed command signal from the A/D converter 21 for rendering a Q output terminal of the RS flip-flop 84 high at the −1 speed. Likewise, the speed changing signal generator 10 causes a Q output terminal of the RS flip-flop 85 to go high in the still reproduction; a Q output terminal of the RS flip-flop 86 to go high at the normal speed; a Q output terminal of the RS flip-flop 87 to go high at the twofold speed; and a Q output terminal of the RS flip-flop 88 to go high at the threefold speed.

When the speed command signal indicative of the −0.5 normal speed from the A/D converter 21 is high, the speed is a combination of the −1 normal speed and the still reproductions. The RS flip-flop 84 is set by the head switching signal as processed by the waveform processing circuit 20 to cause the magnetic tape to run at the −1 normal speed. While the magnetic tape is running at the −1 normal speed, a reproduced control signal is selected by the control signal selection circuit 15 and delayed by the delay circuit 16. The delayed signal is used to set the RS flip-flop 85 and reset the RS flip-flop 84, making the reproduced image still. The above operation is repeated to reproduce video signals at the −0.5 normal speed. The other speeds such as 0.5 normal speed, 1.5 normal speed, and 2.5 normal speed can be achieved in the same manner.

Figure 3:
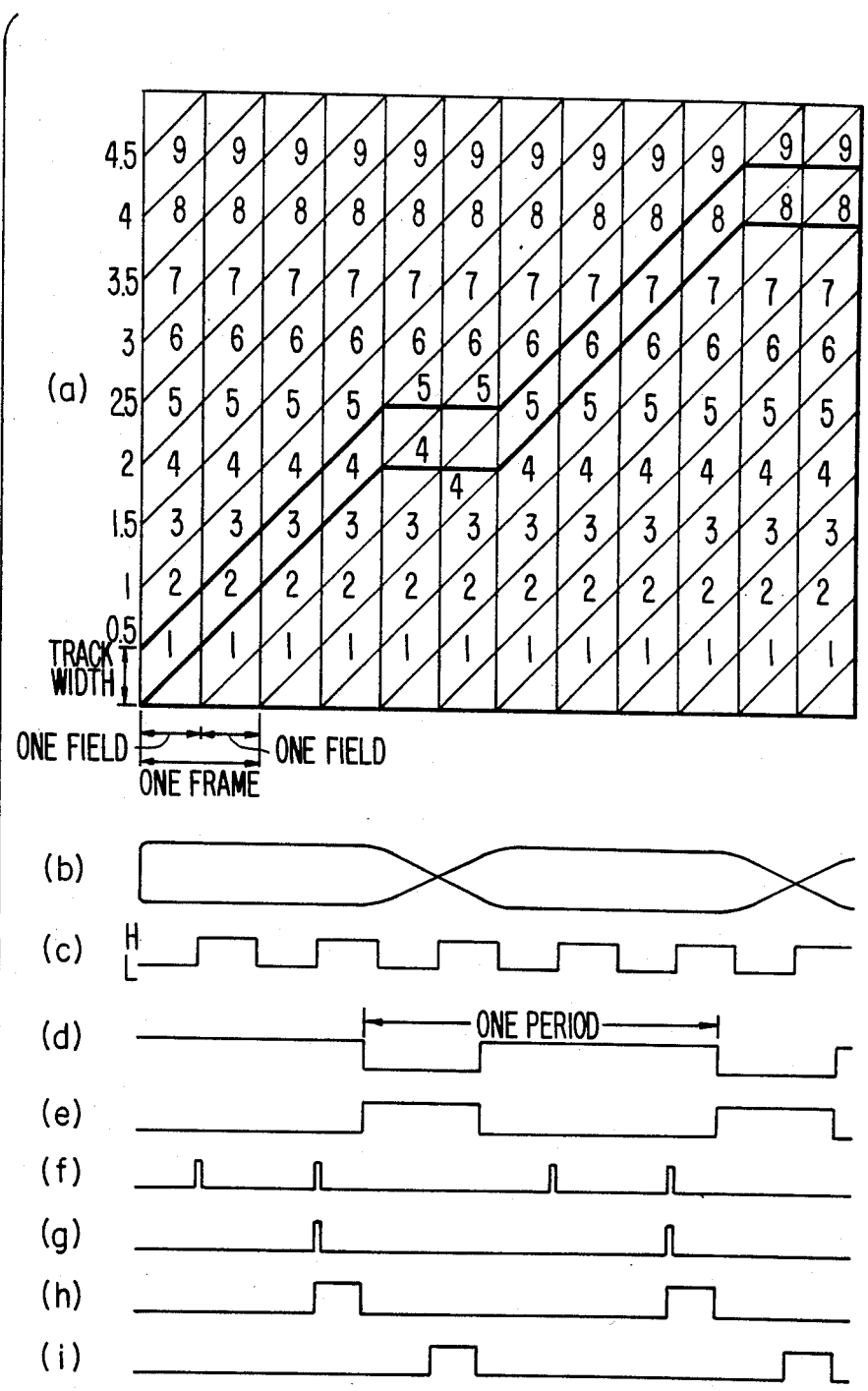
Figure 5:
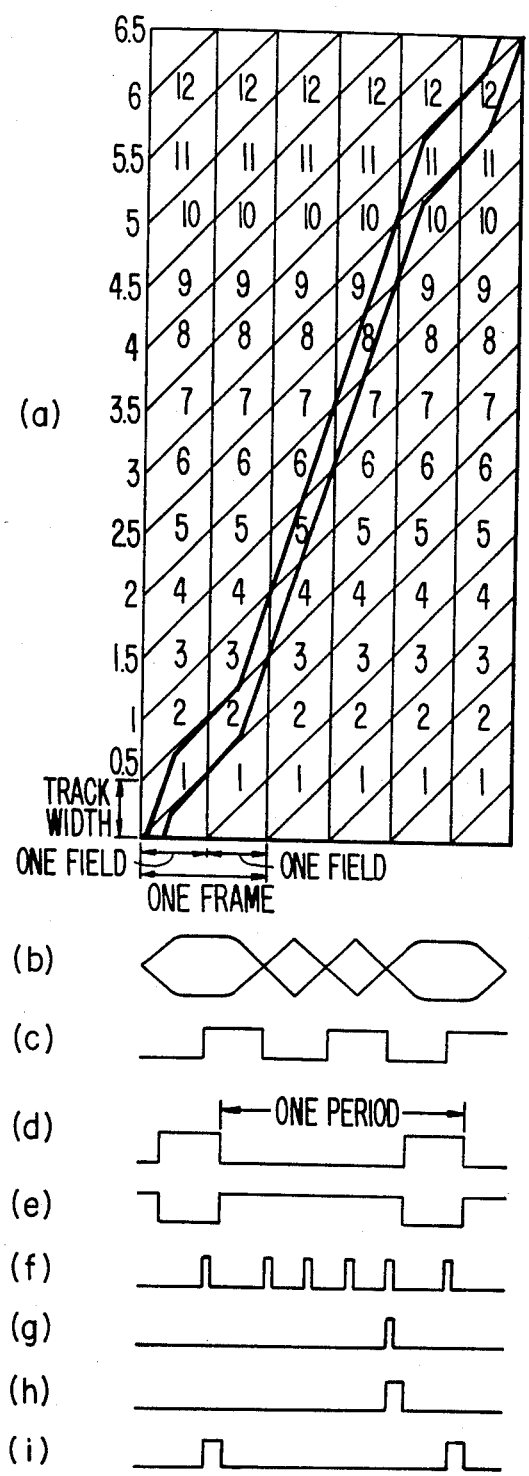

Operation of the video tape recorder of the foregoing construction will be described with reference to FIGS. 3, 4 and 5 for special reproduction modes at a ⅔ normal speed, a 1.5 normal speed, and a 2.5 normal speed.

Figure 1:
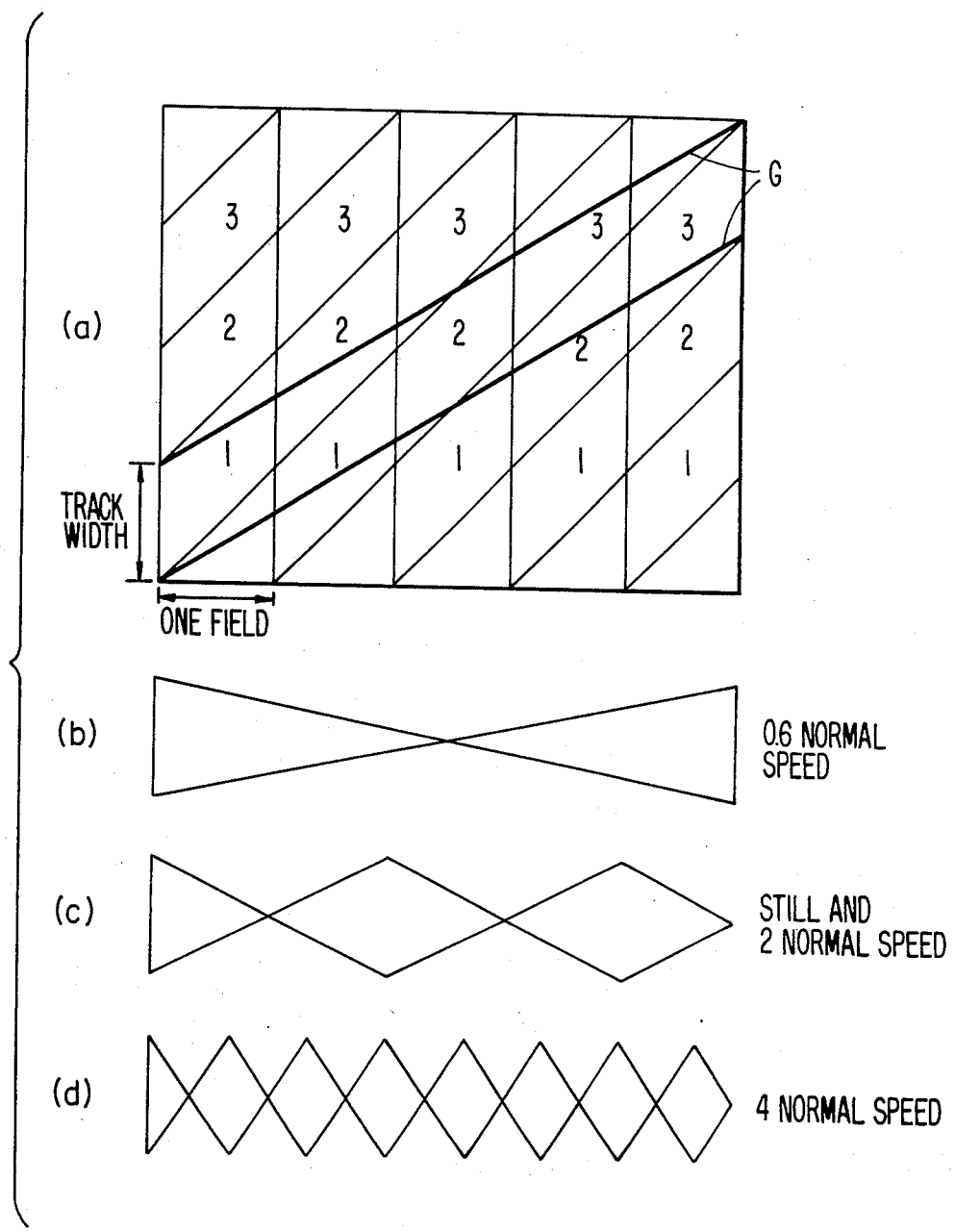
FIGS. 1(a), 1(b), 1(c), and 1(d) are diagrams of head tracks in a 0.6 normal speed reproduction mode, showing repeated track patterns of an azimuth recording system, and envelope waveforms of signals reproduced in 0.6 normal speed, still, twofold normal speed, and fourfold normal speed reproductions.

FIG. 3(a) shows repeated recorded track patterns as in FIG. 1(a). The thicker lines indicate head tracks followed in ⅔ normal speed reproduction.

One graduation on the horizontal axis corresponds to a single field time. Head switching pulses are shown in FIG. 3(c). Since the video tape recorder effects azimuth recording, odd-numbered tracks can only be reproduced by the head A in a period in which the head switching pulse signal is low (L) level, and even-numbered tracks can only be reproduced by the head B in a period in which the head switching pulse signal is high (H) level.

FIG. 3(b) illustrates a reproduced envelope waveform. The vertical axis of FIG. 3(a) shows the distance of travel of the magnetic tape. The distance that the magnetic tape travels for a one-frame period of time is defined as one-frame distance during normal reproduction.

FIGS. 3(d) and 3(e) show output signals from the speed changing signal generator 10 illustrated in FIG. 2. To enable the magnetic tape 1 to travel at the ⅔ normal speed, a voltage from the variable resistor 14 causes an output signal from the A/D converter 21 to be applied to the waveform processing circuit 20, the control signal selection circuit 15, the delay circuit 16, and the speed changing signal generator 10. In response to the output signal from the A/D converter 21, the waveform processing circuit 20 frequency-divides, gates and delays the head switching pulses. FIG. 3(i) shows an output signal produced by the waveform processing circuit at the ⅔ normal speed. FIG. 3(f) illustrates a control signal fed to the control signal selection circuit 15 in the ⅔ normal speed reproduction mode. This control signal is reproduced when the lower ends of the head tracks as shown in FIG. 3(a) pass through the centers (0.5, 1.5, 2.5, . . . ) of the frames along the vertical axis. At the ⅔ normal speed, the control signal selection circuit 15 selects a second control signal in the normal reproduction period, the control signal having a waveform as shown in FIG. 3(g). The selected control signal enables the delay circuit 16 (FIG. 2) to produce a delayed output signal as shown in FIG. 3(h), which is fed to the speed changing signal generator 10.

To achieve the ⅔ normal speed, the normal speed and the still image speed are combined. Therefore, the speed changing signal generator 10 produces a still command signal (FIG. 3(e)) from a negative-going edge of the output signal (h) from the delay circuit 16 which has delayed the control signal in the normal reproduction, and produces a normal command signal (FIG. 3(d)) from a negative-going edge of the output signal (i) from the waveform processing circuit 20. The negative-going edges of the output signals (h) and (i) provide a speed change timing. This timing has an optimum value varying with the special reproduction speed, and the moment of inertia, starting and braking torques of the capstan motor. An acceleration timing however does not have to be changed once it is determined. A deceleration timing needs to be varied when modes are changed from the threefold normal speed to the normal speed, from the twofold normal speed to the normal speed, and from the normal speed to the −1 normal speed. However, the deceleration timing requires almost no change once it is set. Since twofold and threefold speed command signals are unnecessary at this time, an arrangement is provided not to produce such command signals.

The above speed command signals, while they are high level, are applied to the capstan control circuit 6 to control the capstan motor 2.

The normal command signal (FIG. 3(d)) has a period corresponding to a three-frame period. During such a period, the magnetic tape 1 moves two frames at a speed which is expressed by:

$$\text{Speed} = \frac{\text{2-frame distance}}{\text{3-frame time}} = \frac{2}{3} \text{ normal speed}$$

Thus, the ⅔ normal speed can be accomplished by repeating the above period. The reproduced envelope is shown in FIG. 3(b) in which periods of reduced reproduced signal level are positioned in the vicinity of locations where head switching pulses change, that is, in the vicinity of vertical synchronous signals. Accordingly, a video signal is well reproduced without noise bars.

If the head tracks do not follow the solid lines and periods of low reproduced signal level appear on the reproduced image, then the deceleration timing is changed by the variable resistor 17 for the delay circuit 16 to remove noise from the reproduced image.

Where still and normal reproducing modes are repeated per a few frames, it is difficult to effect phase control with the control signal. Therefore, the phase control loop is inhibited from operating to prevent the control system from becoming unstable in operation due to the phase control. During the normal reproduction, only the speed is controlled with a resulting error. Since the deceleration timing is affected by the reproduced control signal, the control signal will be reproduced quickly when the normal reproduction is carried out at a high speed, providing switching to a still image mode rapidly, and the control signal will be reproduced slowly when the normal reproduction is carried out at a low speed, entering the still image mode at a delayed timing. As a result, the still position remains the same and a good image can be reproduced.

Likewise, FIG. 4(a) shows head tracks followed when video signals are reproduced at the 1.5 normal speed. FIG. 4(b) illustrates an envelope of signals reproduced in that mode, and FIG. 4(c) the waveform of head switching pulses. FIG. 4(d) shows a normal command signal, FIG. 4(e) the waveform of a command signal for a twofold normal speed, and FIG. 4(f) a control signal reproduced in the 1.5 normal speed reproduction mode. FIG. 4(g) illustrates a selected control signal, and FIG. 4(h) an output signal from the delay circuit shown in FIG. 2, the output signal having negative-going edges which provide timings for deceleration from the twofold normal speed reproduction to the normal speed reproduction. FIG. 4(i) shows an output signal from the waveform processing circuit 20, the output signal having negative-going edges which provide timings for acceleration from the normal speed reproduction to the twofold normal speed reproduction. The normal command signal (d) and the twofold command signal (e) have a period substantially equal to a two-frame period of time. In such a period, the magnetic tape travels a three-frame distance. Therefore, the 1.5 normal speed reproduction can be achieved by repeating the foregoing period. Since periods of low reproduced signal level are positioned in the vicinity of vertical synchronous signals, as with the ⅔ normal speed reproduction, reproduced images are in good condition free from noise bars.

FIG. 5(a) shows head tracks followed when video signals are reproduced at the 2.5 normal speed. FIG. 5(b) illustrates an envelope of signals reproduced in that mode, and FIG. 5(c) the waveform of head switching pulses. FIG. 5(d) shows a normal command signal, FIG. 5(e) the waveform of a command signal for the threefold normal speed, and FIG. 5(f) a control signal reproduced in the 2.5 normal speed reproduction mode. FIG. 5(g) illustrates a selected control signal, and FIG. 5(h) an output signal from the delay circuit 16 shown in FIG. 2, the output signal having negative-going edges which provide timings for deceleration from the threefold normal speed reproduction to the normal speed reproduction. FIG. 5(i) shows an output signal from the waveform processing circuit 20, the output signal having negative-going edges which provide timings for acceleration from the normal speed reproduction to the threefold normal speed reproduction. The normal command signal (d) and the threefold command signal (e) have a period substantially equal to a two-frame period of time. In such a period, the magnetic tape travels a five-frame distance. Therefore, the 2.5 normall speed reproduction can be achieved by repeating the foregoing period. The reproduced signal envelope produced when the magnetic tape runs at the threefold normal speed differ from that generated when signals are reproduced in the twofold speed and still-image reproduction modes. However, since periods of low reproduced signal level are positioned in the vicinity of vertical synchronous signals, reproduced images are in good condition free from noise bars. When a variable-speed reproduction mode is to be effected by switching between the normal speed and threefold speed reproduction modes, the waveform processing circuit 20 processes signals so that the acceleration timing will be different from the timings for mode changes from the still-image to the normal-speed reproduction, and from the normal-speed to the twofold-speed reproduction. Through combination of the −1 normal speed mode and the still-image mode, and variable-speed reproduction mode can be performed between the −1 normal speed mode and the still-image mode.

Accordingly, variable-speed reproduction in the range from the −1 normal speed mode to the threefold speed mode is rendered possible by changing the distance of travel of the magnetic tape in a unit frame time through combinations of the −1 normal speed, the still, the normal speed, the twofold speed, and the threefold speed.

For variable-speed reproduction according to the invention, the width of tracks followed by a recording-/reproducing magnetic head may be made greater than the width of recorded tracks to improve the envelope of reproduced signals.

A video tape recorder according to another embodiment of the present invention will be described with reference to FIG. 6. Identical components shown in FIG. 6 are denoted by idential reference numerals in FIG. 2.

Figure 6:
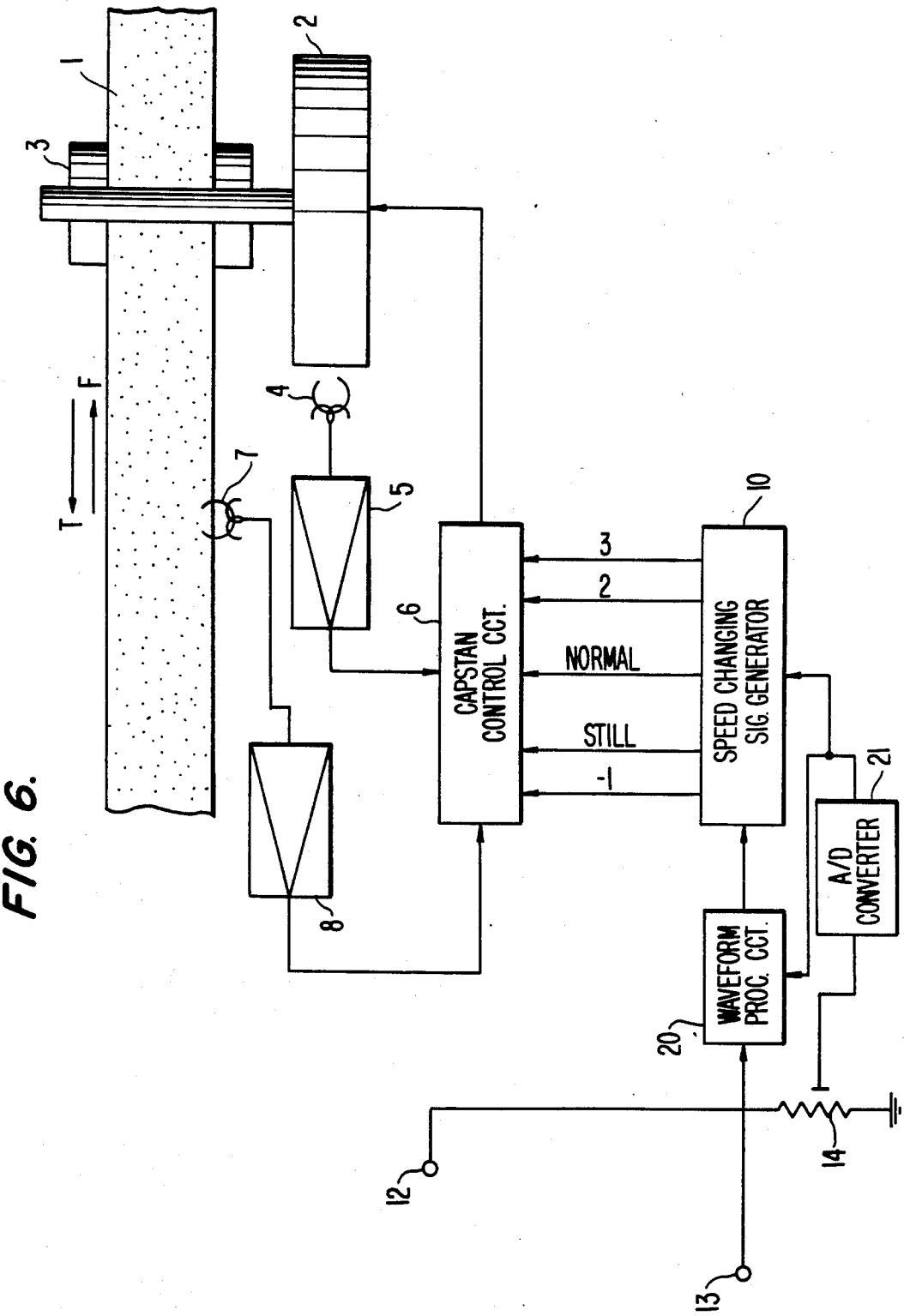
FIG. 6 is a block diagram of a second embodiment of a VTR according to the present invention.

As shown in FIG. 6, a magnetic tape 1 is driven by a capstan motor 2 and a pinch roller 3 to run in either the direction of the arrow F or the direction of the arrow T. An FG head 4 serves to detect a rotational speed signal from the capstan motor 2 and produce an output which is amplified by an amplifier 5. The amplified signal from the amplifier 5 is fed to a capstan control circuit 6. A control head 7 reproduces control signals recorded on the magnetic tape 1 in one-frame period, and produces an output which is amplified by an amplifier 8. The amplified signal from the amplifier 8 is supplied to the capstan control circuit 6.

An input terminal 13 receives head switching pulses (FIG. 3(c)) indicative of changeover between and rotational phase of two rotatable magnetic heads (not shown) attached to a known rotatable cylinder (not shown), the input terminal 13 being connected to an input terminal of a waveform processing circuit 20. The waveform processing circuit 20 effects various waveform processings such as frequency division, delaying, and gating of the head switching pulses. An output from the waveform processing circuit 20 is applied to a speed changing signal generator 10.

A variable resistor 14 is operated by a user for playing back recorded video signals at various speeds in special reproduction. One terminal of the variable resistor 14 is connected to a power supply terminal 12 and the other terminal is grounded. The variable resistor 14 has a center tap from which a voltage is applied to an A/D (analog-to-digital) converter 21. The A/D converter 21 serves to convert the voltage from the variable resistor 14 into a digital signal, which is supplied to the waveform processing circuit 20 and the speed changing signal generator 10. The speed changing signal generator 10 is responsive to the signal from the A/D converter 21 for producing command signals indicative of a −1 normal speed, a stationary image (still image), a normal speed, a twofold normal speed, and a threefold normal speed to the capstan control circuit 6 at a timing of the output signals from the waveform processing circuit 20 for thereby changing the speed of the travel of the magnetic tape 1. The capstan control circuit 6 is arranged to rotate the capstan motor 2 at a constant speed according to the command signal supplied thereto.

The capstan control circuit 6 is capable of controlling the speed of rotation of the capstan motor 2 in response to a signal from the FG head 4, and also capable of controlling the phase of the capstan motor 2 in response to a control signal reproduced by the control head 7.

Since no control is effective when the capstan motor 2 is to be stopped, the capstan control circuit 6 is arranged to produce a braking signal for a certain period of time for stopping the capstan motor 2 in response to a still command.

Figure 7:
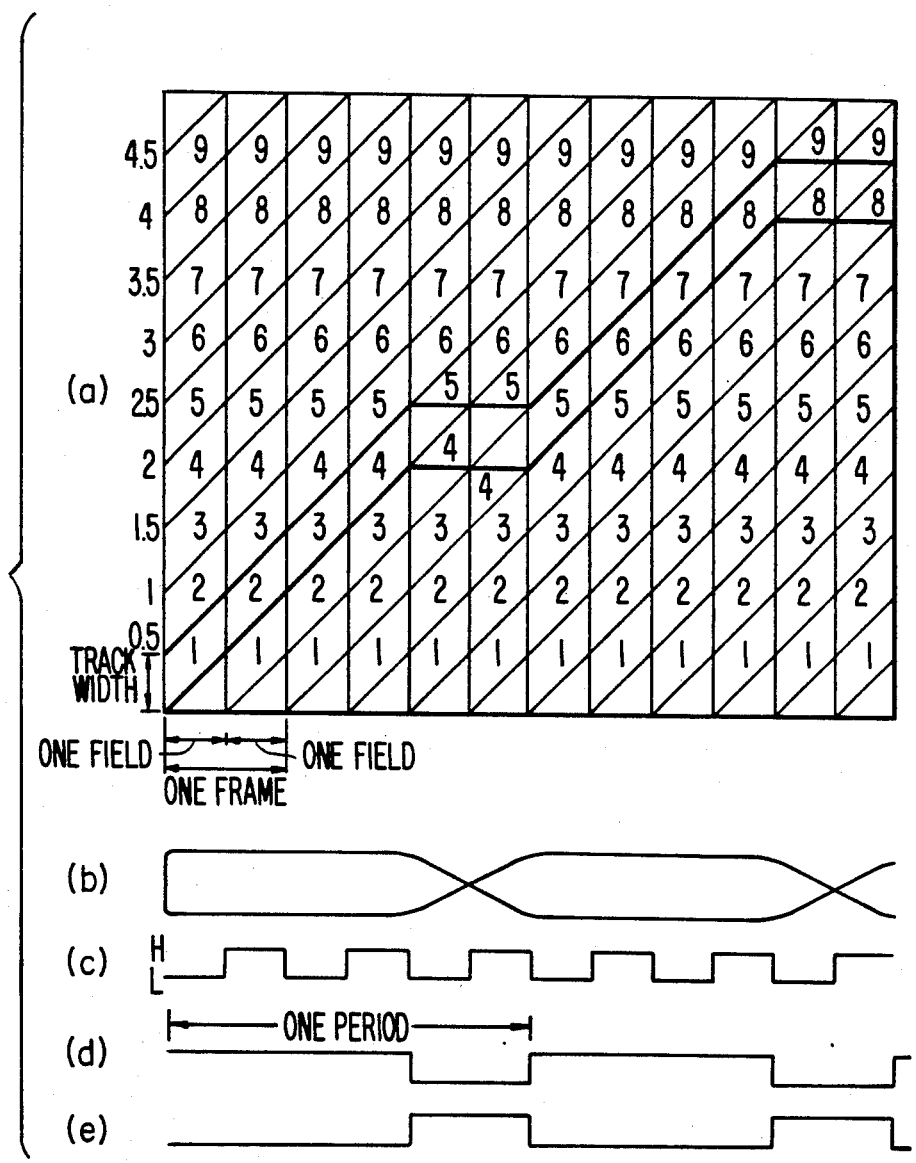

Operation of the video tape recorder of the foregoing construction will be described with reference to FIGS. 7, 8 and 9 for special reproduction modes at a ⅔ normal speed, a 1.5 normal speed, and a 2.5 normal speed.

FIG. 7(a) shows repeated recorded track patterns as in FIG. 1(a). The thicker lines indicate head tracks followed in ⅔ normal speed reproduction.

One graduation on the horizontal axis corresponds to a single field time. Head switching pulses are shown in FIG. 7(c). Since the video tape recorder effects azimuth recording, odd-numbered tracks can only be reproduced by the head A in a period in which the head switching pulse signal is low (L) level, and even-numbered tracks can only be reproduced by the head B in a period in which the head switching pulse signal is high (H) level.

FIG. 7(b) illustrates a reproduced envelope waveform. The vertical axis of FIG. 7(a) shows the distance of travel of the magnetic tape. The distance that the magnetic tape travels for a one-frame period of time is defined as one-frame distance during normal reproduction.

FIGS. 7(d) and 7(e) show output signals from the speed changing signal generator 10 illustrated in FIG. 6. To enable the magnetic tape 1 to travel at the ⅔ normal speed, a voltage from the variable resistor 14 causes an output signal from the A/D converter 21 to be applied to the waveform processing circuit 20 and the speed changing signal generator 10. In response to the output signal from the A/D converter 21, the waveform processing circuit 20 frequency-divides and gates the head switching pulses. To achieve the ⅔ normal speed, the normal speed mode and the still mode are combined. Therefore, the speed changing signal generator 10 produces a normal command signal (FIG. 7(d)) and a still command signal (FIG. 7(e)) in response to the signal from the waveform processing circuit 20. Since twofold and threefold speed command signals are unnecessary at this time, an arrangement is provided not to produce such command signals. The above speed command signals, while they are high level, are applied to the capstan control circuit 6 to control the capstan motor 2.

The normal command signal (FIG. 7(d)) has a period corresponding to a three-frame period. During such a period, the magnetic tape 1 moves two frames at a speed which is expressed by:

$$\text{Speed} = \frac{\text{2-frame distance}}{\text{3-frame time}} = \frac{2}{3} \text{ normal speed}$$

Thus, the ⅔ normal speed can be accomplished by repeating the above period. The reproduced envelope is shown in FIG. 7(b) in which periods of reduced reproduced signal level are positioned in the vicinity of locations where head switching pulses change, that is, in the vicinity of vertical synchronous signals. Accordingly, a video singal is well reproduced without noise bars.

FIG. 8(a) shows head tracks followed when video signals are reproduced at the 1.5 normal speed. FIG. 8(b) illustrates an envelope of signals reproduced in that mode, and FIG. 8(c) the waveform of head switching pulses. FIG. 8(d) shows a normal command signal, and FIG. 8(e) the waveform of a command signal for a twofold normal speed. The normal command signal (d) and the twofold command signal (e) have a period substantially equal to a two-frame interval of time. In such a period, the magnetic tape travels a three-frame distance. Therefore, the 1.5 normal speed reproduction can be achieved by repeating the foregoing period. Since periods of low reproduced signal level are positioned in the vicinity of vertical synchronous signals, as with the ⅔ normal speed reproduction, reproduced images are in good condition free from noise bars.

FIG. 9(a) shows head tracks followed when video signals are reproduced at the 2.5 normal speed. FIG. 9(b) illustrates an envelope of signals reproduced in that mode, and FIG. 9(c) the waveform of head switching pulses. FIG. 9(d) shows a normal command signal, and FIG. 5(e) the waveform of a command signal for a threefold normal speed. The normal command signal (d) and the threefold command signal (e) have a period substantially equal to a two-frame interval of time. In such a period, the magnetic tape travels a five-frame distance. Therefore, the 2.5 normal speed reproduction can be achieved by repeating the foregoing period. The reproduced signal envelope produced when the magnetic tape runs at the threefold normal speed differ from that generated when signals are reproduced in the twofold speed and still reproduction modes. However, since periods of low reproduced signal level are positioned in the vicinity of vertical synchronous signals, reproduced images good in condition free from noise bars. When a variable-speed reproduction mode is to be effected by switching between the normal speed and threefold speed reproduction modes, the waveform processing circuit 20 delays signals so that the switching timing will be at the center of one field of the head switching pulses (FIG. 9(c)).

Accordingly, variable-speed reproduction in the range of from the −1 normal speed mode to the threefold normal speed mode is rendered possible by changing the distance of travel of the magnetic tape in a unit frame time through combinations of the −1 normal speed, the still, the normal speed, the twofold speed, and the threefold speed.

In the foregoing embodiments, the speeds have been assumed for the ease of illustration to switch instantaneously in response to a speed changing command signal. In practice, however, rise and fall times are necessary which are determined by the moment of inertia and starting torque of the capstan motor. The rise and fall times can be determined by calculations, and the waveform processing circuit 20 can be designed to effect signal processing for advancing the speed changing timing by the calculated times.

According to the first embodiment as described with reference to FIGS. 2, 3, 4 and 5, the deceleration timing for speed switching is generated accurately by using a control signal recorded on the magnetic tape in each frame.

With the second embodiment as described with reference to FIGS. 6, 7, 8 and 9, the deceleration timing for speed switching is produced from head switching pulses. This makes the overall circuit arrangement simpler. However, the capstan motor should be phase-controlled as tracks scanned by the head suffer from the tendency to be displaced only under the control of the head switching pulses.

According to a third embodiment of the present invention, a video tape recorder has a main rotatable head and an auxiliary rotatable head disposed adjacent to the main rotatable head and having an azimuth angle different from that of the main rotatable head. The main and auxiliary rotatable heads are selectively used for variable-speed reproduction modes ranging from a normal speed in reverse reproduction to a threefold speed in forward reproduction as in the first and second embodiments. With this arrangement, extreme reductions in level of the envelopes in still-image and twofold speed modes are eliminated to reproduce images in good condition in variable-speed reproduction in the range from the normal speed in reverse reproduction to the threefold speed in forward reproduction.

A circuit arrangement according to the third embodiment for such variable-speed reproduction modes is the same as that of the second embodiment. A process of switching between main rotatable heads M1, M2 and auxialiry rotatable heads S1, S2 will be described with reference to FIGS. 10 and 12.

Figure 10:
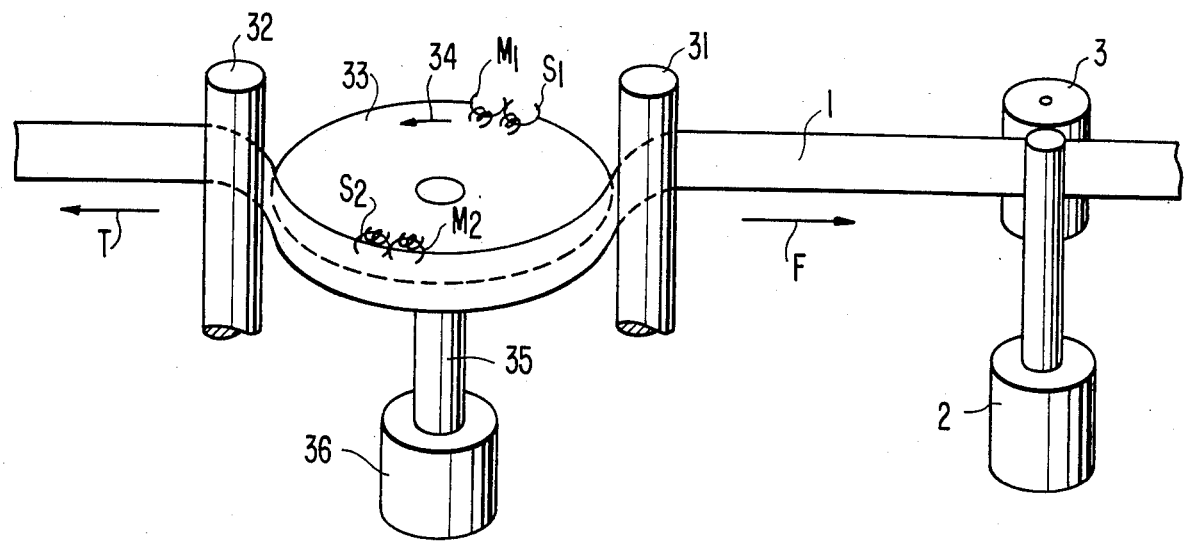
FIG. 10 is a perspective view of rotatable heads and a magnetic tape running system in a third embodiment of a VTR according to the present invention.

FIG. 10 shows main rotatable heads M1, M2 and auxialiry rotatable heads S1, S2. The main rotatable head M1 has an azimuth angle of +6°, the main rotatable head M2 has an azimuth angle of −6°. The main rotatable heads M1, M2 are mounted in the same plane on a rotatable disk 33 in diametrically opposite relation to each other. The auxiliary rotatable heads S1, S2 have azimuth angles of −6° and +6°, respectively, and are mounted in the same plane in diametrically opposite relation to each other. The main rotatable head M1 and the auxiliary rotatable head S1, and the main rotatable head M2 and the auxiliary rotatable head S2 are positioned at spaced intervals corresponding to the peiord of a single horizontal synchronous signal. The rotatable disk 33 is driven by a motor 36 through a rotatale shaft 36 to rotate at 1,800 r.p.m. in the direction of the arrow 34. A magnetic tape 1 is guided by guide posts 31, 32 and fed along by a capstan motor 2 and a pinch roller 3 selectively in the directions of the arrows F and T.

Figure 11:
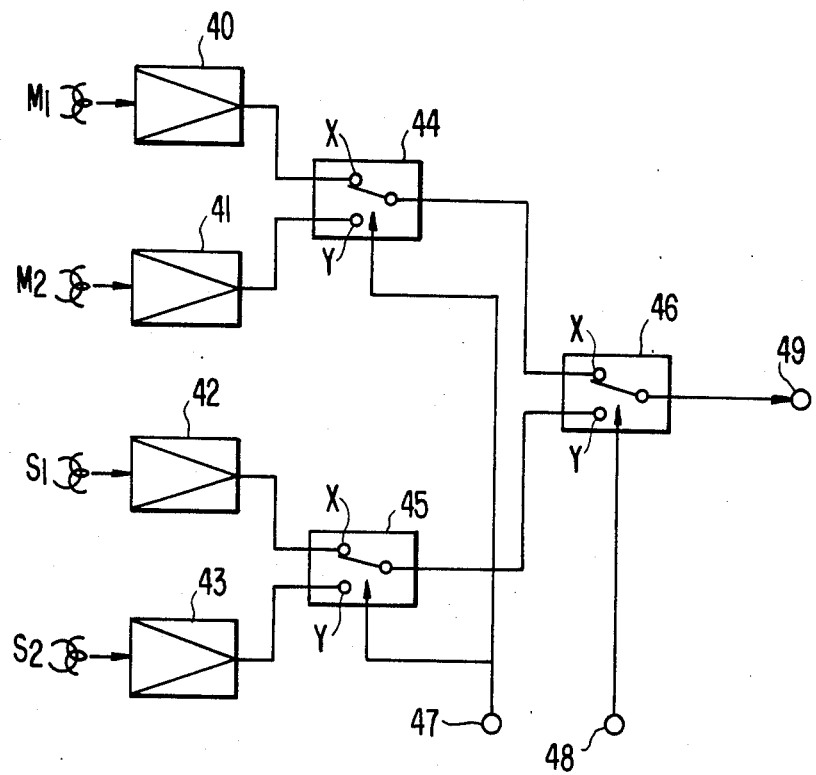
FIG. 11 is a block diagram of a head changeover circuit in the VTR of the invention.

FIG. 11 is illustrative of a circuit for switching between the main rotatable heads M1, M2 and the auxiliary rotatable heads S1, S2.

When a head switching pulse of high logic level is applied to an input terminal 47, movable contacts of switches 44, 45 are connected to fixed contacts X. When a head switching pulse of low logic level is applied to the input terminal 47, the movable contacts of the switches 44, 45 are shifted to fixed contacts Y. As a result, input terminals of a switch 46 are supplied with reproduced output signals from the main rotatable head M1 and the auxiliary rotatable head S1 or reproduced output signals from the main rotatable head M2 and the auxiliary rotatable head S2. At this time, a head switching signal is applied to an input terminal 48. When the head switching signal applied to is high logic level, a movable contact of the switch 46 is connected to fixed contact X. When the head switching signal is low logic level, the movable contact of the switch 46 is connected to fixed contact Y. Thus, a reproduced output signal from a selected one of the main rotatable heads M1, M2 and the auxiliary rotatable heads S1, S2 is delivered to the output terminal 49.

Figure 12:
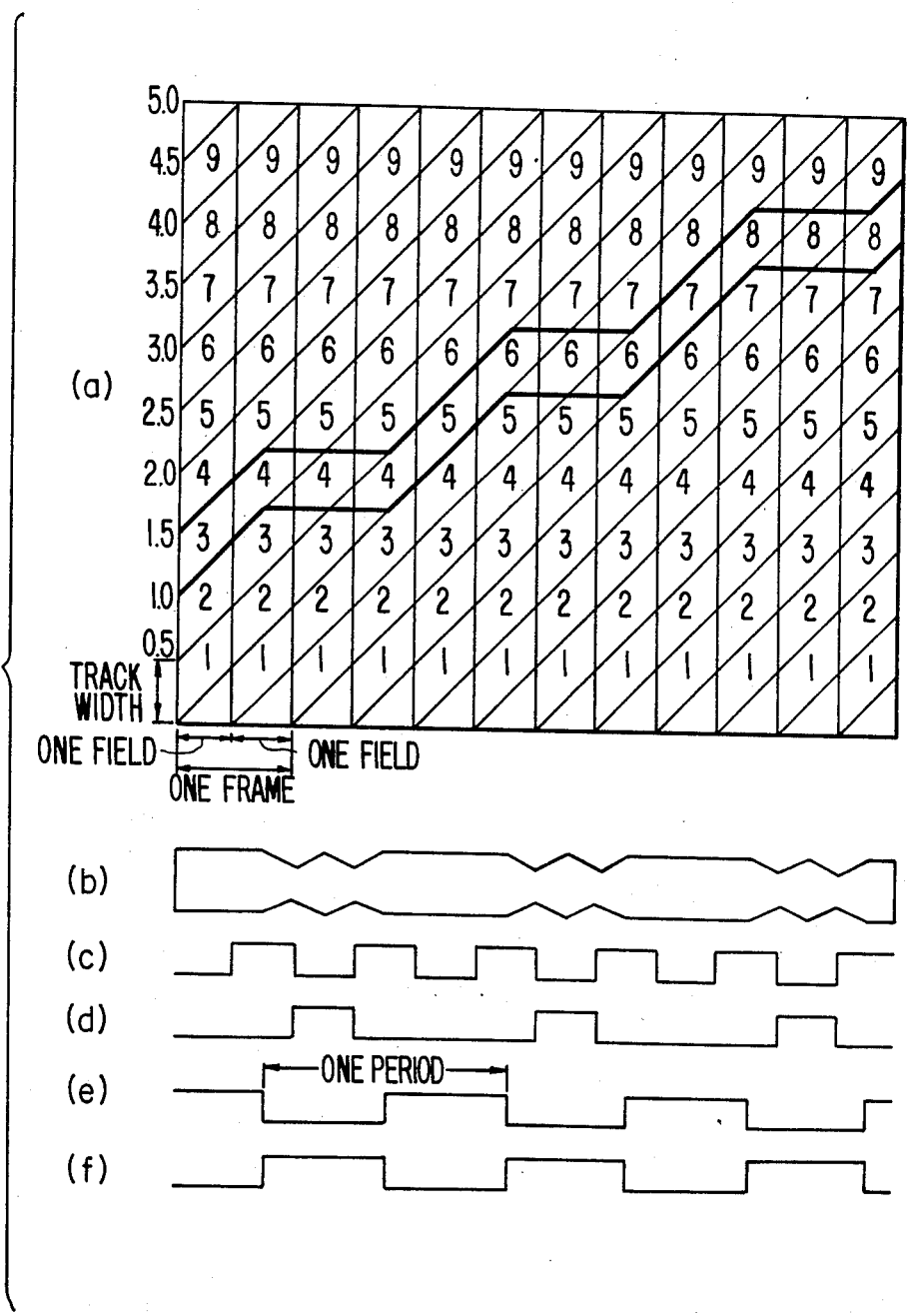
Figure 13:
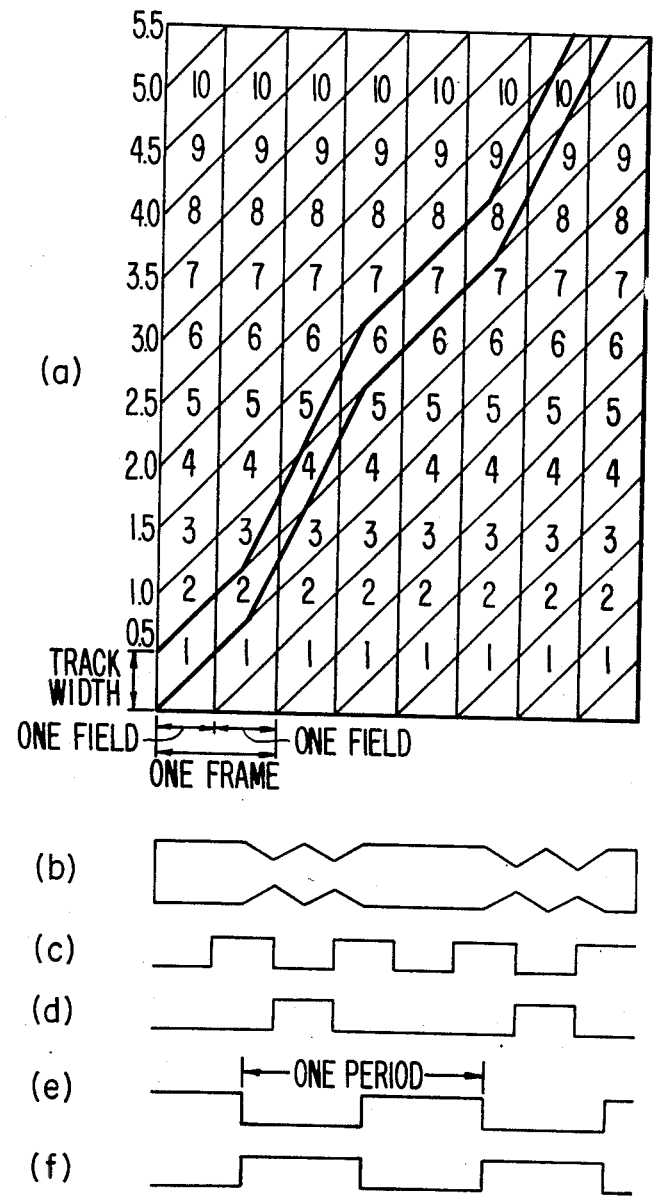

Operation of the video tape recorder of the third embodiment will be described with reference to FIGS. 12, 13, and 14 for special reproduction modes at a 0.5 normal speed, a 1.5 normal speed, and a 2.5 normal speed.

FIG. 12(a) shows repeated recorded track patterns as in FIG. 1(a). The thicker lines indicate head tracks followed in 0.5 normal speed reproduction.

One graduation on the horizontal axis corresponds to a single field time. Head switching pulses are shown in FIG. 12(c). FIG. 12(d) shows a signal for switching between the main and auxiliary rotatable heads. Since the video tape recorder effects azimuth recording, even-numbered tracks can only be reproduced by the main rotatable head M1 and the auxiliary rotatable head S1, and odd-numbered tracks can only be reproduced by the main rotatable head M2 and the auxiliary rotatable head S2. As described above, the movable contacts of the switches 44, 45 are connected to the contacts X when the head switching pulse is high, and to the contacts Y when the head switching pulse is low. When the head switching signal is high, the movable contact of the switch 46 is shifted to the contact Y, and when the head switching signal is low, the movable contact is shifted to the contact X. As a consequence, when the head switching pulse and the head switching signal disagree from each other, the even-numbered tracks are reproduced. When the head switching pulse and the head switching signal are in agreement, the odd-numbered tracks are reproduced.

FIG. 12(b) illustrates a reproduced envelope waveform. The vertical axis of FIG. 12(a) shows the distance of travel of the magnetic tape. The distance that the magnetic type travels for a one-frame period of time is defined as one-frame distance during normal reproduction.

FIGS. 12(e) and 12(f) show output signals from the speed changing signal generator 10 illustrated in FIG. 6. To enable the magnetic tape 1 to travel at the 0.5 normal speed, a voltage from the variable resistor 14 causes an output signal from the A/D converter 21 to be applied to the waveform processing circuit 20 and the speed changing signal generator 10. In response to the output signal from the A/D converter 21, the waveform processing circuit 20 frequency-divides, gates and delays the head switching pulses. To achieve the 0.5 normal speed, the still mode ad the normal speed mode are combined. Therefore, the speed changing signal generator 10 produces a normal command signal (FIG. 12(e)) and a still command signal (FIG. 12(f)) in response to the signal from the waveform processing circuit 20. Since twofold and threefold speed command signals are unnecessary at this time, an arrangement is provided not to produce such command signals. The above speed command signals, while they are high level, are applied to the capstan control circuit 6 to control the capstan motor 2.

The normal command signal (FIG. 12(e)) has a period corresponding to a two-frame interval. During such a period, the magnetic tape 1 moves one frame at a speed which is expressed by:

$$\text{Speed} = \frac{\text{1-frame distance}}{\text{2-frame time}} = 0.5 \text{ normal speed}$$

Thus, the 0.5 normal speed can be accomplished by repeating the above period. The reproduced envelope shown in FIG. 12(b) does not suffer from an abrupt reduction in level as the main rotatable heads M1, M2 and the auxiliary rotatable heads S1, S2 are selectively used by the head switching signal (FIG. 12(d)). Therefore, images are reproduced in good condition.

FIG. 13(a) shows head tracks followed when video signals are reproduced at the 1.5 normal speed. FIG. 13(b) illustrates an envelope of signals reproduced in that mode, and FIG. 13(c) the waveform of head switching pulses. FIG. 13(d) shows the waveform of a head switching signal, FIG. 13(e) a normal command signal, and FIG. 13(f) the waveform of a command signal for a twofold normal speed. The normal command signal (e) and the twofold command signal (f) have a period substantially equal to a two-frame period of time. In such a period, the magnetic tape travels a three-frame distance. Therefore, the 1.5 normal speed reproduction can be achieved by repeating the foregoing period. Since the main rotatable heads M1, M2 and the auxiliary rotatable heads S1, S2 are selectively used as with the 0.5 normal speed reproduction, the reproduced envelope shown in FIG. 13(b) does not suffer from an abrupt reduction in level and images can be reproduced in good condition.

FIG. 14(a) shows head tracks followed when video signals are reproduced at the 2.5 normal speed. FIG. 14(b) illustrates an envelope of signals reproduced in that mode, and FIG. 14(c) the waveform of head switching pulses. FIG. 14(d) shows the waveform of a head switching signal, FIG. 14(e) a twofold speed command signal, and FIG. 14(f) threefold speed command signal. The twofold command signal (e) and the threefold command signal (f) have a period substantially equal to a two-frame period of time. In such a period, the magnetic tape travels a five-frame distance. Therefore, the 2.5 normal speed reproduction can be achieved by repeating the foregoing period.

Where the magnetic tape runs at a constant threefold normal speed, it is not possible to prevent a reproduced envelope from suffering from abrupt level reduction by selecting the main rotatable heads M1, M2 and the auxiliary rotatable heads S1, S2, a condition different from the sill and twofold normal speed modes. Therefore, in the 2.5 normal speed reproduction mode, there are periods in which the reproduced envelope undergoes an abrupt level reduction while the magnetic tape is running at the threefold normal speed. However, such periods can be located in the vicinity of vertical synchronous signals, thus reproducing images in good condition.

In the foregoing description, combinations have been illustrated of the still-image, the normal speed, the twofold normal speed, and the threefold normal speed. The normal speed in reverse reproduction is capable of producing a reproduced envelope equivalent to that of the threefold normal speed reproduction. Therefore, with the normal speed mode in reverse reproduction being added, variable-speed reproduction can be achieved in the range from the normal speed in reverse reproduction to the threefold normal speed in forward reproduction.

In the foregoing embodiments, the speeds have been assumed for the ease of illustration to switch instantaneously in response to a speed changing command signal. In practice, however, rise and fall times are necessary which are determined by the moment of inertia and starting torque of the capstan motor. The rise and fall times can be determined by calculations, and the waveform processing circuit 20 can be designed to effect signal processing for advancing the speed changing timing by the calculated times.

The above description has been directed to an instance where adjacent recorded tracks are arranged closely without any space therebetween. In the case where there are signal-free spaces between the recorded tracks on a magnetic tape, the main rotatable heads M1, M2 and the auxiliary rotatable heads S1, S2 may be switched to prevent the envelope of reproduced signals from being subjected to a level reduction.

Although certain preferred embodiments have been shown and described, it should be understood that many changes and modifications may be made therein without departing from the scope of the appended claims.

What is claimed is:

1. A video tape recorder comprising:
   a magnetic tape drive means including a capstan motor and a pinch roller for driving a magnetic tape having frames recorded therein;
   a control means for controlling said drive means so as to move said magnetic tape at constant speeds including a normal speed, a twofold speed, a threefold speed in forward reproduction, and a normal speed in reverse reproduction, and for keeping said magnetic tape stationary for still reproduction;
   a speed setting means for setting any speed within a range of from said normal speed in reverse reproduction to said threefold speed in forward reproduction;
   a control signal reproducing means for reproducing control signals recorded on said magnetic tape at intervals of one-frame period;
   a control signal selection means for selecting a control signal from said reproduced control signals according to an output signal of said speed setting means;
   a time setting means for producing a signal delayed by a predetermined time period from said control signal selected by said control signal selection means according to said output signal of said speed setting means;
   a waveform processing means for producing a signal by processing a waveform of a head switching pulse used for switching rotatable heads of said recorder according to said output signal of said speed setting means; and
   a speed changing means for alternately producing two command signals selected from command signals which are respectively indicative of said speeds in a time period corresponding to a few of said frames according to said output signal of said speed setting means, said two command signals being applied to said control means so that said control means controls said drive means so as to move said magnetic tape alternately at speeds indicated by said two command signals such that said magnetic tape moves at a speed between said speeds indicated by said two command signals;
   wherein a first of said two command signals are produced in response to said signal produced by said time setting means and a second of said two command signals are reproduced in response to said signal produced by said waveform processing means, said first command signal indicating a speed slower than that indicated by said second command signal.

2. A video tape recorder according to claim 1, said recorder having a pair of main rotatable heads having two different azimuths and attached to a rotating member, and a pair of auxiliary rotatable heads having two different azimuths and attached to said rotating member at positions which are different from those of said main rotatable heads, wherein a large reproduced output is selected from outputs obtained from one of said main rotatable heads and one of said auxiliary rotatable heads.

3. A video tape recorder according to claim 1, wherein said two command signals are indicative of one of the following combinations:
   (1) said stationary still reproduction and said normal speed in forward reproduction;
   (2) said normal speed in reverse reproduction and said stationary still reproduction;
   (3) said normal speed in forward reproduction and said twofold speed;
   (4) said twofold speed and said threefold speed;
   (5) said normal speed in forward reproduction and said threefold speed.

4. A video tape recorder comprising:
   a magnetic tape drive means including a capstan motor and a pinch roller for driving a magnetic tape having frames recorded therein;
   a control signal reproducing means for reproducing control signal recorded on said magnetic tape at intervals of one-frame period;
   a capstan speed detecting means for detecting a speed of said capstan motor;
   a control means for controlling said drive means so as to move said magnetic tape constant speeds including a normal speed, a twofold speed, a threefold speed in forward reproduction, and a normal speed in reverse reproduction, and for keeping said magnetic tape stationary for still reproduction;
   a speed setting means for setting any speed within a range of from said normal speed in reverse reproduction to said threefold speed in forward reproduction;
   a waveform processing means for producing a signal by processing a waveform of a head switching pulse used for switching rotatable heads of said recorder according to an output signal of said speed setting means; and
   a speed changing means for alternately producing two command signals selected from command signals which are respectively indicative of said speeds in a time period corresponding to a few of said frames according to said output signal of said speed setting means, said two command signals being applied to said control means so that said control means controls said drive means so as to move said magnetic tape alternately at speeds indicated by said two command signals such that said magnetic tape moves at a speed between said speeds indicated by said two command signals;

wherein said two command signals are produced in response to said signal produced by said waveform processing means.

5. A video tape recorder according to claim 4, said recorder having a pair of main rotatable heads having two different azimuths and attached to a rotating member, and a pair of auxiliary rotatable heads having two different azimuths and attached to said rotating member at positions which are different from those of said main rotatable heads;
   wherein a large reproduced output is selected from outputs obtained from one of said main rotatable heads and one of said auxiliary rotatable heads.

6. A video tape recorder according to claim 4, wherein said two command signals are indicative of one of the following combinations;
   (1) said stationary still reproduction and said normal speed in forward reproduction;
   (2) said normal speed in reverse reproduction and said stationary still reproduction;
   (3) said normal speed in forward reproduction and said twofold speed;
   (4) said twofold speed and said threefold speed;
   (5) said normal speed in forward reproduction and said threefold speed.

* * * * *